(12) United States Patent
Sun et al.

(10) Patent No.: US 12,308,463 B2
(45) Date of Patent: May 20, 2025

(54) BATTERY, POWER CONSUMPTION DEVICE, AND METHOD AND DEVICE FOR PRODUCING BATTERY

(71) Applicant: CONTEMPORARY AMPEREX TECHNOLOGY (HONG KONG) LIMITED, Hong Kong (CN)

(72) Inventors: Zhanyu Sun, Ningde (CN); Chao Long, Ningde (CN); Peng Wang, Ningde (CN); Xingdi Chen, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 499 days.

(21) Appl. No.: 17/750,668

(22) Filed: May 23, 2022

(65) Prior Publication Data
US 2023/0268604 A1    Aug. 24, 2023

Related U.S. Application Data

(63) Continuation of application No. PCT/CN2022/077152, filed on Feb. 21, 2022.

(51) Int. Cl.
*H01M 50/293* (2021.01)
*H01M 50/291* (2021.01)

(52) U.S. Cl.
CPC ....... *H01M 50/293* (2021.01); *H01M 50/291* (2021.01); *H01M 2220/20* (2013.01)

(58) Field of Classification Search
CPC ............. H01M 50/293; H01M 50/291; H01M 2220/20
(Continued)

(56) References Cited

U.S. PATENT DOCUMENTS

| 7,147,963 | B2 | 12/2006 | Kimoto et al. |
| 2004/0201366 | A1 | 10/2004 | Kimoto et al. |

(Continued)

FOREIGN PATENT DOCUMENTS

| CN | 1328705 A | 12/2001 |
| CN | 1 1038 0151 A | 10/2019 |

(Continued)

OTHER PUBLICATIONS

Extended European Search Report dated Jun. 21, 2023 received in European Patent Application No. EP 22719768.8.

(Continued)

*Primary Examiner* — Allison Bourke
*Assistant Examiner* — Robert Gene West
(74) *Attorney, Agent, or Firm* — Scully, Scott, Murphy & Presser, P.C.

(57) ABSTRACT

Embodiments of the present application provide a battery, a power consumption device, and a method and device for producing a battery. The battery includes: a plurality of battery cells arranged in a first direction; and a spacer plate, the spacer plate extending in the first direction and being connected to a first wall of each battery cell of the plurality of battery cells, the first wall being a wall of the battery cell that has a largest surface area, a surface of the spacer plate being provided with an insulating layer, a size of the spacer plate in a second direction being less than 0.5 mm, and the second direction being perpendicular to the first wall. According to technical solutions of the embodiments of the present application, performance of the battery could be improved.

15 Claims, 10 Drawing Sheets

(58) Field of Classification Search
USPC .......................................................... 429/247
See application file for complete search history.

(56) References Cited

U.S. PATENT DOCUMENTS

| | | | |
|---|---|---|---|
| 2013/0022856 A1 | 1/2013 | Michelitsch et al. | |
| 2021/0265679 A1 | 8/2021 | Wang et al. | |
| 2022/0416343 A1* | 12/2022 | He ...................... | H01M 10/613 |

FOREIGN PATENT DOCUMENTS

| | | | | |
|---|---|---|---|---|
| CN | 110993845 | A | | 4/2020 |
| CN | 111009629 | A | | 4/2020 |
| CN | 112072008 | A | | 12/2020 |
| DE | 102018216833 | A1 | * | 4/2020 |
| JP | 2006244756 | A | | 9/2006 |
| JP | 2018120790 | A | | 8/2018 |
| JP | 2022523847 | A | | 4/2022 |
| JP | 2023503414 | A | | 1/2023 |
| KR | 10-2020-0066421 | A | | 6/2020 |
| KR | 20200066421 | A | * | 6/2020 |
| WO | WO 2020/207230 | A1 | | 10/2020 |
| WO | 2020/252846 | A1 | | 12/2020 |
| WO | WO 2021/098440 | A1 | | 5/2021 |

OTHER PUBLICATIONS

Notice of Reasons for Refusal dated Mar. 25, 2024 received in Japanese Patent Application No. JP 2022-529361.
International Search report and Written opinion dated Oct. 25, 2022 received in International Application No. PCT/CN2022/077152.
Korean Office Action dated Oct. 17, 2024 received in the Korean Intellectual Property Office for Patent Application No. KR 10-2022-7016437.
Decision to Reject dated Oct. 7, 2024 received in Japanese Patent Application No. JP 2022-529361.

* cited by examiner

BATTERY, POWER CONSUMPTION DEVICE, AND METHOD AND DEVICE FOR PRODUCING BATTERY

CROSS-REFERENCE TO RELATED APPLICATIONS

This application is a continuation of International Application No. PCT/CN2022/077152, filed on Feb. 21, 2022, the disclosure of which is hereby incorporated by reference in its entirety.

TECHNICAL FIELD

The present application relates to the field of battery technologies, and in particular, to a battery, a power consumption device, and a method and device for producing a battery.

BACKGROUND

With the increasing environmental pollution, the new energy industry has attracted more and more attention from people. In the new energy industry, the battery technology is an important factor related to its development.

A space utilization ratio of an interior of a battery affects power and energy density of the battery, and further affects performance of the battery. How to improve performance of a battery is an urgent technical problem to be solved in the battery technology.

SUMMARY

The present application provides a battery, a power consumption device, and a method and device for producing a battery, which could ensure electrical insulation in the battery while improving energy density of the battery, thereby improving performance of the battery.

In a first aspect, a battery is provided, including: a plurality of battery cells arranged in a first direction; and a spacer plate, the spacer plate extending in the first direction and being connected to a first wall of each battery cell of the plurality of battery cells, the first wall being a wall of the battery cell that has a largest surface area, and a surface of the spacer plate being provided with an insulating layer, where a size T1 of the spacer plate in a second direction is less than 0.5 mm, and the second direction is perpendicular to the first wall.

In an embodiment of the present application, in a battery, a spacer plate is disposed to be connected to a first wall of each battery cell of a column of a plurality of battery cells arranged in a first direction that has a largest surface area, and a size of the spacer plate in a second direction perpendicular to the first direction is set to be less than 0.5 mm. The plurality of battery cells are connected as a whole through the spacer plate. In this case, no side plate is provided in the battery, and there is no need to provide a structure such as a beam, which can greatly improve a space utilization ratio of an interior of the battery, thereby improving energy density of the battery. The electrical connection between the spacer plate and the battery cells is avoided by providing an insulating layer on a surface of the spacer plate. Therefore, the technical solution of the embodiment of the present application could ensure electrical insulation in the battery while improving energy density of the battery, thereby improving performance of the battery.

In a possible implementation manner, the size T1 of the spacer plate in the second direction is not less than 0.05 mm. In this way, it can be avoided that a strength demand of the battery cannot be met due to a too small size of the spacer plate in the second direction.

In a possible implementation manner, an area S1 of a surface of the spacer plate that is connected to first walls of the plurality of battery cells and a total area S2 of the first walls of the plurality of battery cells that are connected to a same side of the spacer plate satisfy: $0.25 \leq S1/S2 \leq 4$.

When the value of S1/S2 is too small, that is, when the area S1 of the surface of the spacer plate that is connected to the first walls of the plurality of battery cells is much smaller than the total area S2 of the first walls of the plurality of battery cells that are connected to the same side of the spacer plate, a contact area between the first walls and the spacer plate is too small to meet the strength demand of the battery. When the value of S1/S2 is too great, that is, when the area S1 of the surface of the spacer plate that is connected to the first walls is much larger than the total area S2 of the first walls of the plurality of battery cells that are connected to the same side of the spacer plate, the spacer plate occupies too much space of the interior of the battery compared with the battery cells, which is disadvantageous to the improvement of the energy density of the battery. Therefore, the value of S1/S2 is set to be 0.25~4, which can improve both the energy density of the battery and strength of the battery.

In a possible implementation manner, in a third direction, a size H1 of the spacer plate and a size H2 of the first wall of the battery cell satisfy: $0.2 \leq H1/H2 \leq 2$, and the third direction is perpendicular to the first direction and the second direction.

When H1/H2 is too small, that is, when in the third direction, the size H1 of the spacer plate is much smaller than the size H2 of the first wall of the battery cell, the contact area between the first walls and the spacer plate is too small to meet the strength demand of the battery. When H1/H2 is too great, that is, when in the third direction, the size H1 of the spacer plate is much greater than the size H2 of the first wall of the battery cell, the spacer plate occupies too much space of the interior of the battery compared with the battery cells, which is disadvantageous to the improvement of the energy density of the battery. Therefore, the value of H1/H2 is set to be 0.2~2, which can improve both the energy density of the battery and the strength of the battery.

In a possible implementation manner, in the first direction, a size L1 of the spacer plate and a size L2 of the plurality of battery cells satisfy: $0.5 \leq L1/L2 \leq 2$.

When L1/L2 is too small, that is, when in the first direction, the size L1 of the spacer plate is much smaller than the size L2 of the first wall of the battery cell, the contact area between the first walls and the spacer plate is too small to meet the strength demand of the battery. When L1/L2 is too great, that is, when in the first direction, the size L1 of the spacer plate is much greater than the size L2 of the first wall of the battery cell, the spacer plate occupies too much space of the interior of the battery compared with the battery cells, which is disadvantageous to the improvement of the energy density of the battery. Therefore, the value of L1/L2 is set to be 0.5~2, which can improve both the energy density of the battery and the strength of the battery.

In a possible implementation manner, a size T2 of the insulating layer in the second direction satisfies: $0.01 \text{ mm} \leq T2 \leq 0.3 \text{ mm}$.

When the size T2 of the insulating layer in the second direction is too small, the insulating layer cannot effectively avoid the electrical connection between the battery cells and the spacer plate, and bad insulation occurs in the battery. When the size T2 of the insulating layer in the second direction is too great, the insulating layer occupies too much space of the interior of the battery, which is disadvantageous to the improvement of the energy density of the battery. Therefore, the value of T2 is set to be 0.01~0.3 mm, which can both improve the energy density of the battery and ensure safety of the battery.

In a possible implementation manner, a voltage U of the battery and a size T2 of the insulating layer in the second direction satisfy: $0.01\times10^{-3}$ mm/V$\leq$T2/U$\leq3\times10^{-3}$ mm/V.

When T2/U is too small, that is, when the size T2 of the insulating layer in the second direction per unit voltage is too small, the insulating layer cannot effectively avoid the electrical connection between the battery cells and the spacer plate, and bad insulation occurs in the battery, which has a potential safety hazard. When T2/U is too great, that is, when the size T2 of the insulating layer in the second direction per unit voltage is too great, the insulating layer occupies too much space of the interior of the battery, which is disadvantageous to the improvement of the energy density of the battery. Therefore, the value of T2/U is set to be $0.01\times10^{-3}\sim3\times10^{-3}$ mm/V, which can both improve the energy density of the battery and ensure the safety of the battery.

In a possible implementation manner, the battery cell includes two first walls disposed opposite to each other in the second direction and two second walls disposed opposite to each other in the first direction, where in the first direction, the second walls of two adjacent battery cells are opposite to each other.

In a possible implementation manner, the battery includes multiple columns of the plurality of battery cells arranged in the first direction and a plurality of spacer plates, where the multiple columns of the battery cells and the plurality of spacer plates are alternately disposed in the second direction.

In this way, first walls of each column of the plurality of battery cells arranged in the first direction can be connected to a spacer plate, each column of the plurality of battery cells arranged in the first direction can be connected as a whole through the spacer plate, and thus the strength of the battery is effectively improved.

In a possible implementation manner, the battery includes a plurality of battery modules, a battery module includes at least one column of the plurality of battery cells arranged in the first direction and at least one spacer plate, and the at least one column of the battery cells and the at least one spacer plate are alternately disposed in the second direction. In this way, the multiple columns of the battery cells and the plurality of spacer plate are connected to each other to form a whole, and are accommodated in a box, which could not only effectively fix each column of the battery cells, but also ensure the energy density of the overall battery, thereby improving the performance of the battery.

In a possible implementation manner, the battery module includes N columns of the battery cells and N−1 spacer plate(s), the spacer plate is disposed between two adjacent columns of the battery cells, and N is an integer greater than 1. In this way, fewer spacer plates may be disposed in the battery, and at the same time, it can be ensured that each battery cell could be connected to the spacer plate.

In a possible implementation manner, the plurality of battery modules are arranged in the second direction, and a gap is provided between adjacent battery modules. The gap may provide an expansion space for the battery cells.

In a possible implementation manner, the spacer plate is bonded to the first wall.

The spacer plate is fixedly connected to the first wall by means of bonding, and the structure is simple, which is convenient for processing and assembly.

In a second aspect, a power consumption device is provided, including: the battery in the above first aspect or any possible implementation manner of the first aspect, the battery being configured to provide electric energy.

In a third aspect, a method for producing a battery is provided, including: providing a plurality of battery cells arranged in a first direction; and providing a spacer plate, the spacer plate extending in the first direction and being connected to a first wall of each battery cell of the plurality of battery cells, the first wall being a wall of the battery cell that has a largest surface area, and a surface of the spacer plate being provided with an insulating layer, where a size T1 of the spacer plate in a second direction is less than 0.5 mm, and the second direction is perpendicular to the first wall.

In a fourth aspect, a device for producing a battery is provided, including a module for executing the method according to the above third aspect.

In an embodiment of the present application, in a battery, a spacer plate is disposed to be connected to a first wall of each battery cell of a column of a plurality of battery cells arranged in a first direction that has a largest surface area, and a size of the spacer plate in a second direction perpendicular to the first direction is set to be less than 0.5 mm. The plurality of battery cells are connected as a whole through the spacer plate. In this case, no side plate is provided in the battery, and there is no need to provide a structure such as a beam, which can greatly improve a space utilization ratio of an interior of the battery, thereby improving energy density of the battery. The electrical connection between the spacer plate and the battery cells is avoided by providing an insulating layer on a surface of the spacer plate. Therefore, the technical solution of the embodiment of the present application could ensure electrical insulation in the battery while improving energy density of the battery, thereby improving performance of the battery.

BRIEF DESCRIPTION OF DRAWINGS

In order to illustrate technical solutions in embodiments of the present application more clearly, brief description will be made below to accompanying drawings required in the embodiments of the present application. Apparently, the accompanying drawings described below are some embodiments of the present application only, and other drawings could be obtained based on these accompanying drawings by those ordinary skilled in this art without creative efforts.

Figure 1:
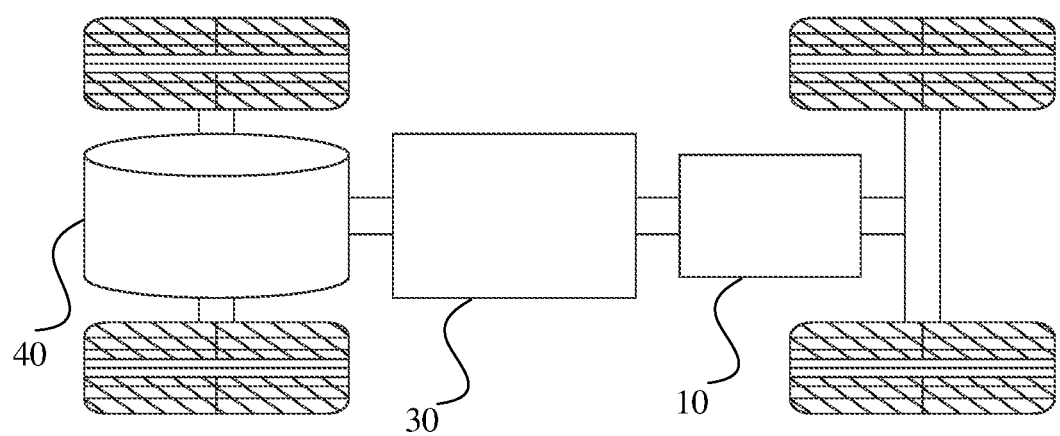
FIG. 1 is a schematic structural diagram of a vehicle disclosed in an embodiment of present application.

In the accompanying drawings, the accompanying drawings are not drawn to actual scale.

DESCRIPTION OF EMBODIMENTS

Implementation manners of the present application will be further described below in detail with reference to drawings and embodiments. The detailed description of the following embodiments and the accompanying drawings are used to exemplarily illustrate principles of the present application, but cannot be used to limit the scope of the present application, that is, the present application is not limited to the described embodiments.

In the depiction of the present application, it should be noted that, unless otherwise illustrated, all technological and scientific terms used have the same meanings as those commonly understood by those skilled in the art to which the present application belongs. The terms used are merely for the purpose of describing specific embodiments, but are not intended to limit the present application. The terms "including" and "having" and any variations thereof in the specification and the claims of the present application as well as the brief description of the drawings described above are intended to cover non-exclusive inclusions. The meaning of "a plurality of" is two or more; and orientations or positional relationships indicated by terms such as "up", "down", "left", "right", "inside", and "outside" are merely for convenience of describing the present application and for simplifying the description, rather than for indicating or implying that an apparatus or element indicated must have a specific orientation, and must be constructed and operated in a specific orientation, which thus shall not be understood as limitation to the present application. In addition, the terms such as "first", "second", and "third" are merely intended for the purpose of description, and shall not be understood as an indication or implication of relative importance. "Vertical" is not strictly vertical, but within an allowable range of error. "Parallel" is not strictly parallel, but within an allowable range of error.

The phrase "embodiment" mentioned in the present application means that the specific features, structures, or characteristics described with reference to the embodiment may be included in at least one embodiment of the present application. The phrase at various locations in the specification does not necessarily refer to the same embodiment, or an independent or alternate embodiment that is mutually exclusive from another embodiment. Those skilled in the art understand, in explicit and implicit manners, that the embodiments described in the present application may be combined with another embodiment.

The terms representing orientations in the following description are all directions shown in the drawings, and do not limit the specific structure of the present application. In the description of the present application, it should be further noted that, unless otherwise explicitly specified and defined, terms "installation", "interconnection" and "connection" should be understood in a broad sense; for example, they may be either a fixed connection, or a detachable connection, or an integrated connection; and they may be either a direct connection, or an indirect connection through an intermediate medium, or communication between interiors of two elements. Those of ordinary skill in the art may appreciate the specific meanings of the foregoing terms in the present application according to specific conditions.

In the present application, the term "and/or" is only an association relation describing associated objects, which means that there may be three relations. For example, A and/or B may represent three situations: A exists alone, both A and B exist, and B exists alone. In addition, the character "/" in the present application generally indicates that the associated objects before and after the character are in an "or" relationship.

In the present application, a battery cell may include a lithium-ion secondary battery, a lithium-ion primary battery, a lithium-sulfur battery, a sodium/lithium-ion battery, a sodium-ion battery, a magnesium-ion battery, or the like, which is not limited in the embodiments of the present application. The battery cell may be cylindrical, flat, cuboid or in another shape, which is not limited in the embodiments of the present application. A battery cell is generally divided into three types according to the way of packaging: a cylindrical battery cell, a prismatic battery cell and a pouch battery cell, which is also not limited in the embodiments of the present application.

The battery mentioned in the embodiments of the present application refers to a single physical module including one or more battery cells to provide a higher voltage and capacity. For example, the battery mentioned in the present application may include a battery pack or the like. The battery generally includes a box for packaging one or more battery cells. The box can avoid liquid or other foreign matters to affect charging or discharging of the battery cell.

The battery cell includes an electrode assembly and an electrolytic solution, and the electrode assembly is composed of a positive electrode sheet, a negative electrode sheet and a separator. The operation of the battery cell mainly relies on movement of metal ions between the positive electrode sheet and the negative electrode sheet. The positive electrode sheet includes a positive electrode current collector and a positive electrode active material layer. The positive electrode active material layer is coated on a surface of the positive electrode current collector, the current collector not coated with the positive electrode active material layer protrudes from the current collector coated with the positive electrode active material layer, and the current collector not coated with the positive electrode active material layer is used as a positive electrode tab. In an example of a lithium-ion battery, the material of the positive electrode current collector may be aluminum, and the positive electrode active material may be lithium cobalt oxides, lithium iron phosphate, ternary lithium, lithium manganate, or the like. The negative electrode sheet includes a negative electrode current collector and a negative electrode active material layer. The negative electrode active material layer is coated on a surface of the negative electrode current collector, the current collector not coated with the negative electrode active material layer protrudes from the current collector coated with the negative electrode active material layer, and the current collector not coated with the negative electrode active material layer is used as a negative electrode tab. The material of the negative electrode current collector may be copper, and the negative electrode active material may be carbon, silicon, or the like. In order to ensure that no fusing occurs when a large current passes, there are a plurality of positive electrode tabs which are stacked together, and there are a plurality of negative electrode tabs which are stacked together. The material of the separator may be polypropylene (PP), polyethylene (PE), or the like. In addition, the electrode assembly may be a winding structure or a laminated structure, and the embodiments of the present application are not limited thereto.

In order to meet different power demands, the battery may include a plurality of battery cells, where the plurality of battery cells may be in series connection, parallel connection or series-parallel connection. The series-parallel connection refers to a combination of series connection and parallel connection. Optionally, the plurality of battery cells may be first connected in series, in parallel or in series and parallel to constitute a battery module, and then a plurality of battery modules are connected in series, in parallel or in series and parallel to constitute a battery. That is, the plurality of battery cells may directly constitute a battery, or may first constitute a battery module, and then battery modules constitute a battery. The battery is further disposed in a power consumption device to provide electrical energy for the power consumption device.

With the development of the battery technology, it is necessary to consider design factors in multiple aspects simultaneously, such as energy density, cycle life, discharge capacity, C-rate, and safety. Among them, when an internal space of the battery is fixed, improvement of a utilization ratio of the internal space of the battery is an effective means to improve the energy density of the battery. However, while improving the utilization ratio of the internal space of the battery, it is possible to reduce structural strength of the battery. For example, a beam used to mount the battery module is usually disposed in an interior of the box of the battery. In addition, the battery module in the battery is also provided with a side plate and an end plate. The above-mentioned beam, side plate and end plate occupy the internal space of the battery while implementing the fixing of the battery. However, if the beam, the side plate and the end plate are not provided, the structural strength of the battery will be insufficient, and the performance of the battery will be affected.

In view of this, an embodiment of the present application provides a technical solution. In the embodiment of the present application, in a battery, a spacer plate is disposed to be connected to a first wall of each battery cell of a column of a plurality of battery cells arranged in a first direction that has a largest surface area, and a size of the spacer plate in a second direction perpendicular to the first direction is set to be less than 0.5 mm. The plurality of battery cells are connected as a whole through the spacer plate. In this case, no side plate is provided in the battery, and there is no need to provide a structure such as a beam, which can greatly improve a space utilization ratio of an interior of the battery, thereby improving energy density of the battery. The electrical connection between the spacer plate and the battery cells is avoided by providing an insulating layer on a surface of the spacer plate. Therefore, the technical solution of the embodiment of the present application could ensure electrical insulation in the battery while improving energy density of the battery, thereby improving performance of the battery.

The technical solutions described in the embodiments of the present application are all applicable to various apparatuses using batteries, such as mobile phones, portable devices, notebook computers, electromobiles, electric toys, electric tools, electric vehicles, ships and spacecrafts. For example, the spacecrafts include airplanes, rockets, space shuttles, spaceships, and the like.

It should be understood that the technical solutions described in the embodiments of the present application are not only applicable to the devices described above, but also applicable to all devices using batteries. However, for brief description, the following embodiments are all described by an example of an electric vehicle.

For example, as shown in FIG. 1, FIG. 1 is a schematic structural diagram of a vehicle 1 according to an embodiment of the present application. The vehicle 1 may be a fuel-powered vehicle, a gas-powered vehicle or a new energy vehicle, and the new energy vehicle may be a battery electric vehicle, a hybrid vehicle, an extended-range vehicle, or the like. A motor 40, a controller 30 and a battery 10 may be disposed in an interior of the vehicle 1, and the controller 30 is configured to control the battery 10 to supply power to the motor 40. For example, the battery 10 may be disposed at the bottom, head or tail of the vehicle 1. The battery 10 may be configured to supply power to the vehicle 1. For example, the battery 10 may be used as an operation power source of the vehicle 1 for a circuit system of the vehicle 1, for example, for a working power demand of the vehicle 1 during startup, navigation and running. In another embodiment of the present application, the battery 10 may be used not only as an operation power source of the vehicle 1, but also as a driving power source of the vehicle 1, replacing or partially replacing fuel or natural gas to provide driving power for the vehicle 1.

Figure 2:
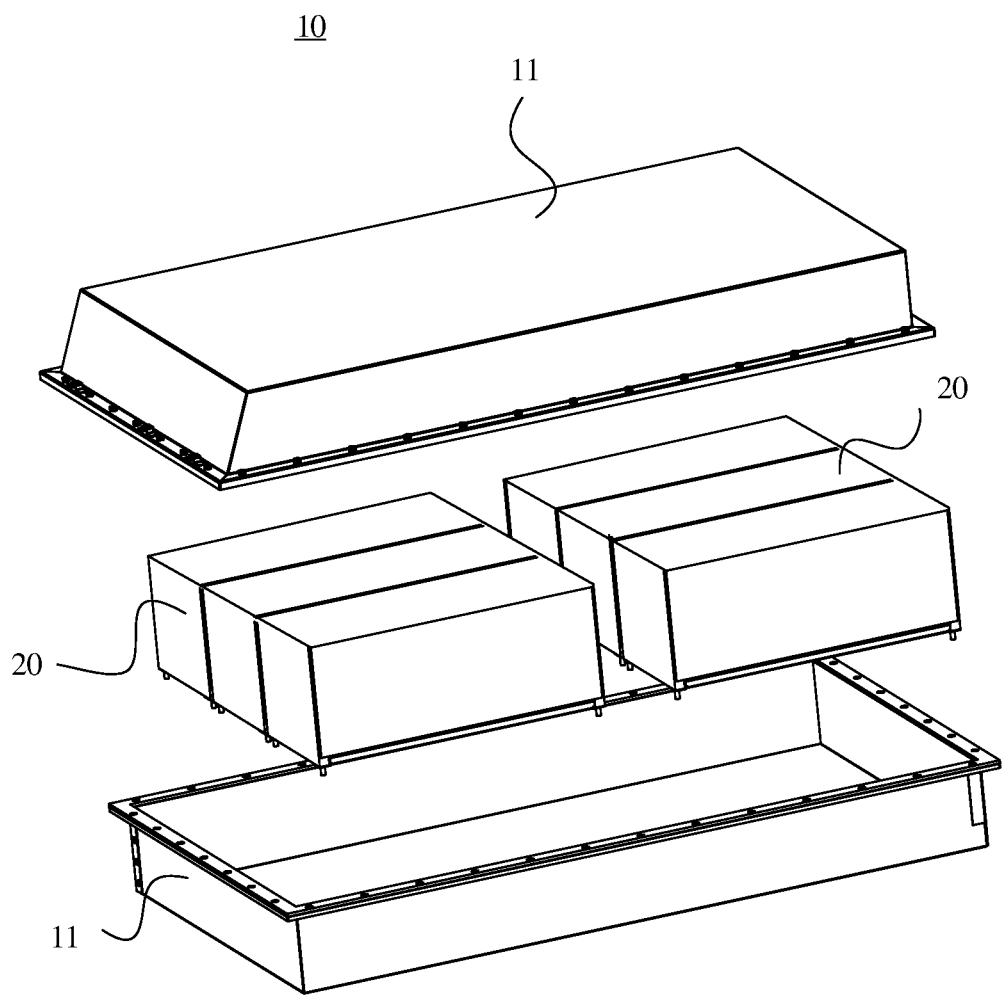
FIG. 2 is a schematic diagram of an exploded structure of a battery disclosed in an embodiment of the present application.

In order to meet different power usage demands, the battery 10 may include a plurality of battery cells. For example, as shown in FIG. 2, FIG. 2 is a schematic structural diagram of a battery 10 according to an embodiment of the present application. The battery 10 may include a plurality of battery cells 20. The battery 10 may further include a box 11, an interior of the box 11 is a hollow structure, and the plurality of battery cells 20 are accommodated in the box 11. For example, the plurality of battery cells 20 are combined in parallel connection or series connection or series-parallel connection and then placed in the box 11.

Optionally, the battery 10 may further include another structure, which will not be repeated redundantly herein. For example, the battery 10 may further include a bus component, and the bus component is configured to implement the electrical connection between the plurality of battery cells 20, such as parallel connection, series connection or series-parallel connection. Specifically, the bus component may implement the electrical connection between the battery cells 20 by connecting electrode terminals of the battery cells 20. Further, the bus component may be fixed to the electrode terminals of the battery cells 20 by means of welding. Electric energy of the plurality of battery cells 20 may be further led out through an electrically conductive mechanism to pass through the box. Optionally, the electrically conductive mechanism may also belong to the bus component.

According to different power demands, the number of battery cells 20 may be set to any value. The plurality of battery cells 20 may be connected in series, in parallel or in series and parallel to implement a larger capacity or power.

Since there may be many battery cells 20 included in each battery 10, the battery cells 20 may be arranged in groups for convenience of installation, and each group of battery cells 20 constitutes a battery module. The number of battery cells 20 included in the battery module is not limited and may be set according to demands. The battery may include a plurality of battery modules, and these battery modules may be connected in series, in parallel or in series and parallel.

Figure 3:
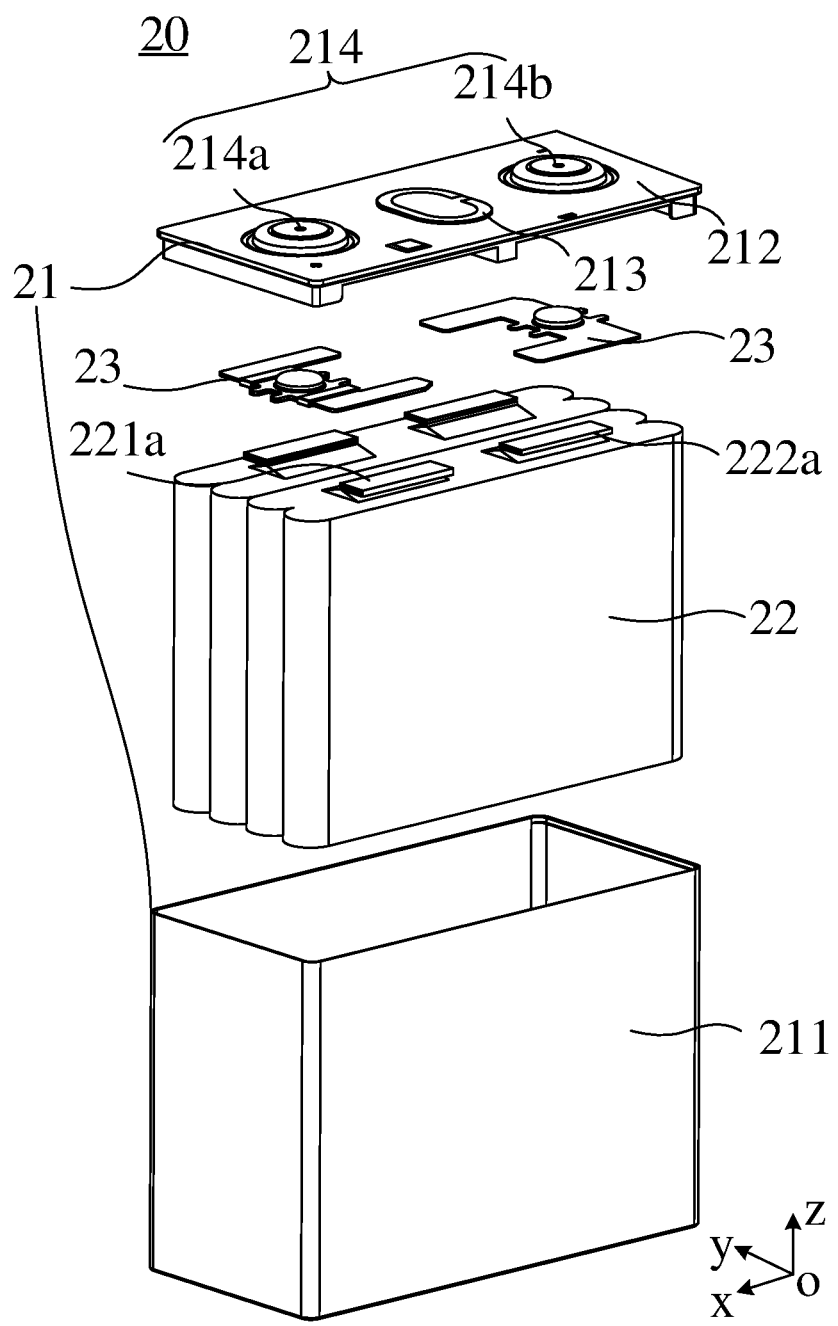
FIG. 3 is a schematic diagram of an exploded structure of a battery cell disclosed in an embodiment of the present application.

As shown in FIG. 3, FIG. 3 is a schematic structural diagram of a battery cell 20 according to an embodiment of the present application. The battery cell 20 includes one or more electrode assemblies 22, a housing 211 and a cover plate 212. The housing 211 and the cover plate 212 form a shell or a battery case 21. A wall of the housing 211 and the cover plate 212 each are referred to as a wall of the battery cell 20, where for a cuboid battery cell 20, the wall of the housing 211 includes a bottom wall and four side walls. The housing 211 is shaped according to a shape of the one or more electrode assemblies 22 after combination. For example, the housing 211 may be a hollow cuboid or cube or cylinder, and one face of the housing 211 has an opening, so that the one or more electrode assemblies 22 may be placed in the housing 211. For example, when the housing 211 is a hollow cuboid or cube, one plane of the housing 211 is a surface with an opening, that is, the plane does not have a wall, so that the inside and outside of the housing 211 are in communication with each other. When the housing 211 may be a hollow cylinder, an end face of the housing 211 is a surface with an opening, that is, the end face does not have a wall, so that the inside and outside of the housing 211 are in communication with each other. The cover plate 212 covers the opening and is connected to the housing 211 to form a closed cavity in which the electrode assemblies 22 are placed. The housing 211 is filled with an electrolyte, such as an electrolytic solution.

The battery cell 20 may further include two electrode terminals 214, and the two electrode terminals 214 may be disposed on the cover plate 212. The cover plate 212 is generally in a shape of a flat plate, and the two electrode terminals 214 are fixed on a flat plate face of the cover plate 212. The two electrode terminals 214 are a positive electrode terminal 214a and a negative electrode terminal 214b, respectively. Each electrode terminal 214 is correspondingly provided with a connecting member 23 also called as a current collecting member 23, which is located between the cover plate 212 and the electrode assembly 22 and configured to electrically connect the electrode assembly 22 to the electrode terminal 214.

As shown in FIG. 3, each electrode assembly 22 has a first electrode tab 221a and a second electrode tab 222a. The first electrode tab 221a and the second electrode tab 222a have opposite polarities. For example, when the first electrode tab 221a is a positive electrode tab, the second electrode tab 222a is a negative electrode tab. First electrode tabs 221a of the one or more electrode assemblies 22 are connected to one electrode terminal through one connecting member 23, and second electrode tabs 222a of the one or more electrode assemblies 22 are connected to the other electrode terminal through the other connecting member 23. For example, the positive electrode terminal 214a is connected to the positive electrode tab through one connecting member 23, and the negative electrode terminal 214b is connected to the negative electrode tab through the other connecting member 23.

In this battery cell 20, according to actual usage demands, the electrode assembly 22 may be set to be single or multiple in number. As shown in FIG. 3, four independent electrode assemblies 22 are disposed in the battery cell 20.

A pressure relief mechanism 213 may also be disposed on the battery cell 20. The pressure relief mechanism 213 is configured to be actuated when an internal pressure or temperature of the battery cell 20 reaches a threshold, to relieve the internal pressure or temperature.

The pressure relief mechanism 213 may be various possible pressure relief structures, which is not limited in the embodiments of the present application. For example, the pressure relief mechanism 213 may be a temperature-sensitive pressure relief mechanism, the temperature-sensitive pressure relief mechanism is configured to be capable of being melted when the internal temperature of the battery cell 20 provided with the pressure relief mechanism 213 reaches a threshold; and/or the pressure relief mechanism 213 may be a pressure-sensitive pressure relief mechanism, and the pressure-sensitive pressure relief mechanism is configured to be capable of being fractured when an internal gas pressure of the battery cell 20 provided with the pressure relief mechanism 213 reaches a threshold.

Figure 4:
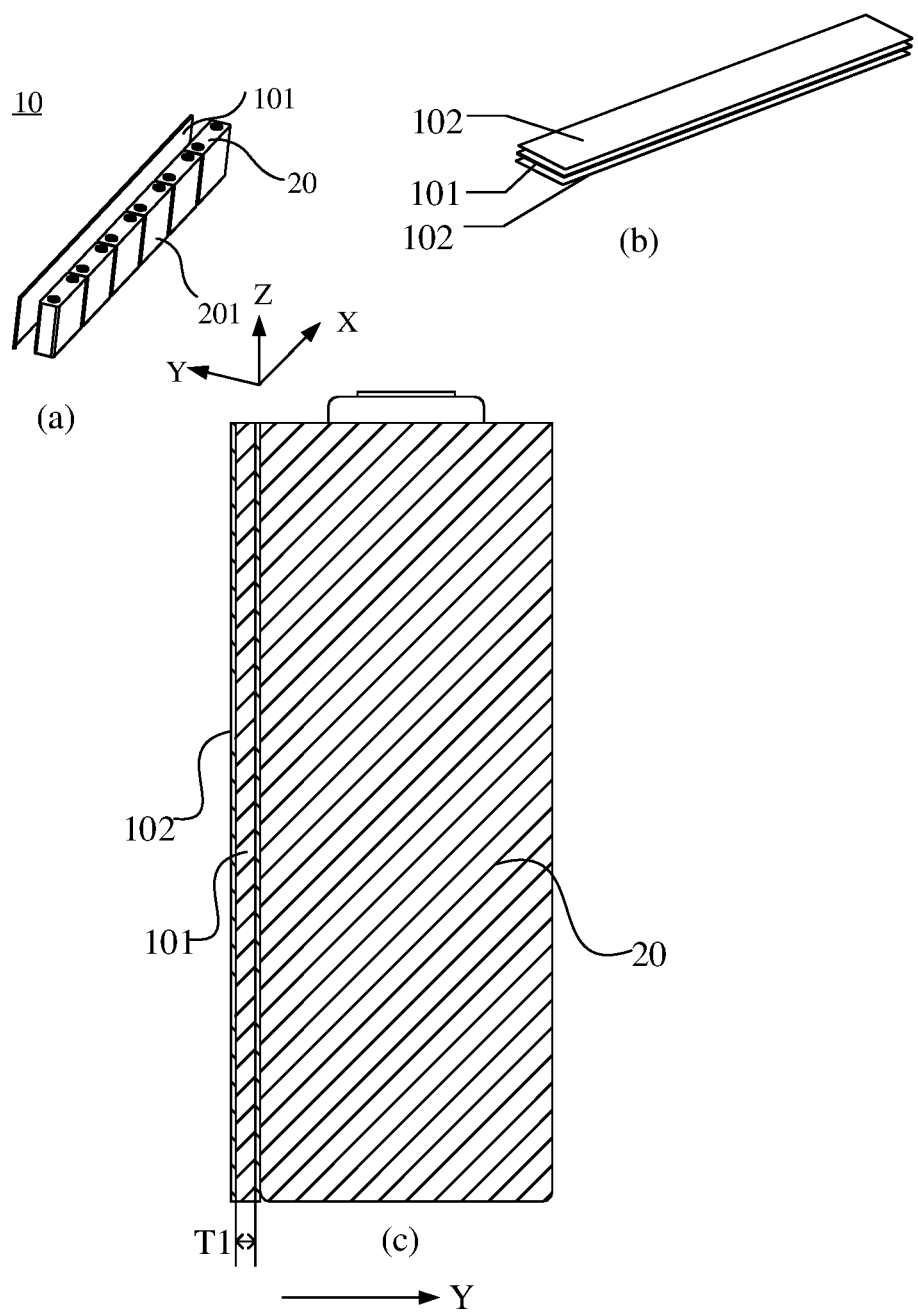
FIG. 4 is a schematic structural diagram of part of a battery disclosed in an embodiment of the present application.

FIG. 4 shows a schematic structural diagram of a battery 10 according to an embodiment of the present application. As shown in (a) of FIG. 4, the battery 10 includes a plurality of battery cells 20 arranged in a first direction X and a spacer plate 101, the spacer plate 101 extends in the first direction X and is connected to a first wall 201 of each battery cell 20 of the plurality of battery cells 20, and the first wall 201 is a wall of the battery cell 20 that has a largest surface area.

In this way, the first wall 201 of each battery cell 20 of the plurality of battery cells 20 that has a largest surface area is connected to the spacer plate 101, and the plurality of battery cells 20 are connected as a whole through the spacer plate 101. In this case, no side plate is provided in the battery 10, and there is no need to provide a structure such as a beam, which can greatly improve a space utilization ratio of an interior of the battery 10 and improve energy density of the battery 10.

In an embodiment of the present application, as shown in (b) of FIG. 4, a size T1 of the spacer plate 101 in a second direction Y is less than 0.5 mm, and the second direction Y is perpendicular to the first wall 201.

In this way, it can be avoided that the spacer plate 101 occupies too much space of the interior of the battery 10 due to the great size of the spacer plate 101 in the second direction Y, the space utilization ratio of the interior of the battery 10 is further improved, and thus the energy density of the battery 10 is improved.

In an embodiment of the present application, as shown in (c) of FIG. 4, a surface of the spacer plate 101 is provided with an insulating layer 102, which avoids the electrical connection between the spacer plate 101 and the battery cells 20 and improves safety of the battery 10. Optionally, the insulating layer 102 may be an insulating film bonded to the surface of the spacer plate 101 or insulating paint coated on the surface of the spacer plate 101.

In an embodiment of the present application, a size T2 of the insulating layer 102 in the second direction Y satisfies: 0.01 mm≤T2≤0.3 mm.

When the size T2 of the insulating layer 102 in the second direction Y is too small, the insulating layer 102 cannot effectively avoid the electrical connection between the battery cells 20 and the spacer plate 101, and bad insulation occurs in the battery 10, which has a potential safety hazard. When the size T2 of the insulating layer 102 in the second direction Y is too great, the insulating layer 102 occupies too much space of the interior of the battery 10, which is disadvantageous to the improvement of the energy density of the battery 10. Therefore, the value of T2 is set to be 0.01~0.3 mm, which can both improve the energy density of the battery 10 and ensure safety of the battery 10.

In an embodiment of the present application, a voltage U of the battery 10 and a size T2 of the insulating layer 102 in the second direction Y satisfy: $0.01 \times 10^{-3}$ mm/V$\leq$T2/U$\leq$3$\times 10^{-3}$ mm/V.

The insulating effect of the insulating layer 102 is related not only to the thickness of the insulating layer 102, but also to the thickness of the insulating layer 102 corresponding to per unit voltage. When T2/U is too small, that is, when the size T2 of the insulating layer 102 in the second direction Y per unit voltage is too small, the insulating layer 102 cannot effectively avoid the electrical connection between the battery cells 20 and the spacer plate 101, and bad insulation occurs in the battery 10, which has a potential safety hazard. When T2/U is too great, that is, when the size T2 of the insulating layer 102 in the second direction Y per unit voltage is too great, the insulating layer 102 occupies too much space of the interior of the battery 10, which is disadvantageous to the improvement of the energy density of the battery 10. Therefore, the value of T2/U is set to be 0.01×10-3~3×10-3 mm/V, which can both improve the energy density of the battery 10 and ensure the safety of the battery 10.

In an embodiment of the present application, the size T1 of the spacer plate 101 in the second direction Y is not less than 0.05 mm. In this way, it can be avoided that stiffness of the spacer plate 101 is too small to meet a strength demand of the battery 10 due to a too small size of the spacer plate 101 in the second direction, that is, a small thickness of the spacer plate 101.

Figure 5:
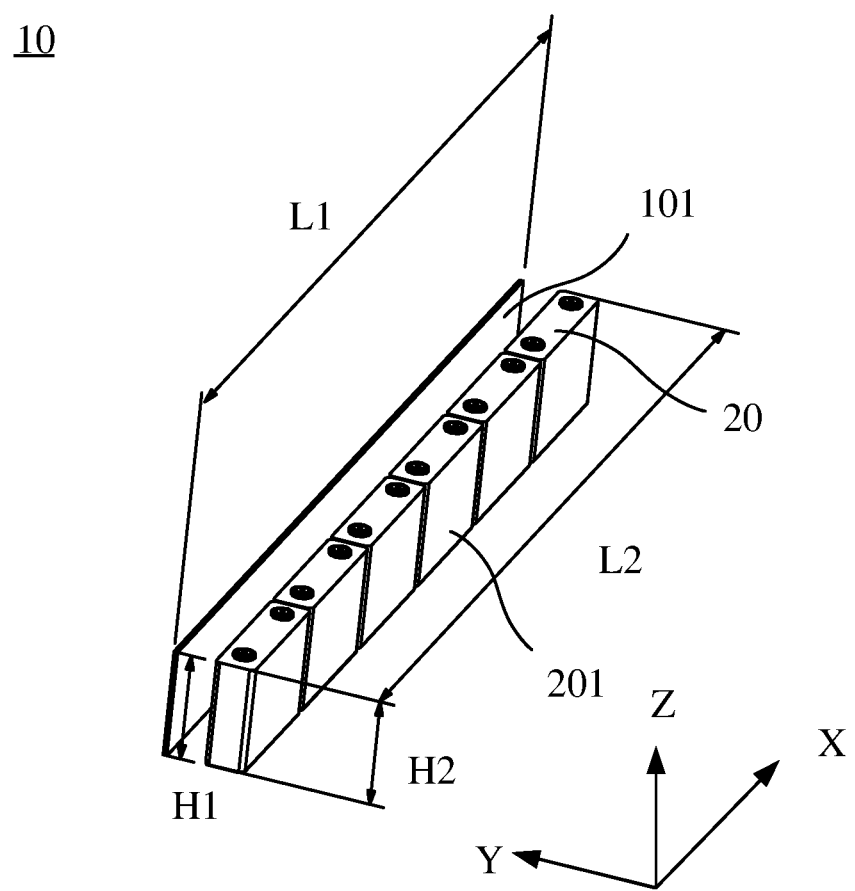
FIG. 5 is a schematic structural diagram of part of a battery disclosed in an embodiment of the present application.

In an embodiment of the present application, an area S1 of a surface of the spacer plate 101 that is connected to first walls 201 of the plurality of battery cells 20 and a total area S2 of the first walls 201 of the plurality of battery cells 20 that are connected to a same side of the spacer plate 101 satisfy: $0.25 \leq S1/S2 \leq 4$, where $S1=H1*L1$, and $S2=H2*L2$. As shown in FIG. 5, H1 is a size of the spacer plate 101 in a third direction Z, L1 is a size of the spacer plate 101 in the first direction X, H2 is a size of a single battery cell 20 in the third direction Z, and L2 is a sum of sizes of the plurality of battery cells 20 in the first direction X.

When the value of S1/S2 is too small, that is, when the area S1 of the surface of the spacer plate 101 that is connected to the first walls 201 of the plurality of battery cells 20 is much smaller than the total area S2 of the first walls 201 of the plurality of battery cells 20 that are connected to the same side of the spacer plate 101, a contact area between the first walls 201 and the spacer plate 101 is too small to meet the strength demand of the battery 10. When the value of S1/S2 is too great, that is, when the area S1 of the surface of the spacer plate 101 that is connected to the first walls 201 is much larger than the total area S2 of the first walls 201 of the plurality of battery cells 20 that are connected to the same side of the spacer plate 101, the spacer plate 101 occupies too much space of the interior of the battery 10 compared with the battery cells 20, which is disadvantageous to the improvement of the energy density of the battery 10. Therefore, the value of S1/S2 is set to be 0.25~4, which can improve both the energy density of the battery 10 and strength of the battery 10.

In an embodiment of the present application, as shown in FIG. 5, in the third direction Z, the size H1 of the spacer plate 101 and the size H2 of the first wall 201 of the battery cell 20 satisfy: $0.2 \leq H1/H2 \leq 2$, and the third direction Z is perpendicular to the first direction X and the second direction Y.

When H1/H2 is too small, that is, when in the third direction Z, the size H1 of the spacer plate 101 is much smaller than the size H2 of the first wall 201 of the battery cell 20, the contact area between the first walls 201 and the spacer plate 101 is too small to meet the strength demand of the battery 10. When H1/H2 is too great, that is, when in the third direction Z, the size H1 of the spacer plate 101 is much greater than the size H2 of the first wall 201 of the battery cell 20, the spacer plate 101 occupies too much space of the interior of the battery 10 compared with the battery cells 20, which is disadvantageous to the improvement of the energy density of the battery 10. Therefore, the value of H1/H2 is set to be 0.2~2, which can improve both the energy density of the battery 10 and the strength of the battery 10.

In an embodiment of the present application, as shown in FIG. 5, in the first direction X, the size L1 of the spacer plate 101 and the size L2 of the plurality of battery cells 20 satisfy: $0.5 \leq L1/L2 \leq 2$.

When L1/L2 is too small, that is, when in the first direction X, the size L1 of the spacer plate 101 is much smaller than the size L2 of the first wall 201 of the battery cell 20, the contact area between the first walls 201 and the spacer plate 101 is too small to meet the strength demand of the battery 10. When L1/L2 is too great, that is, when in the first direction X, the size L1 of the spacer plate 101 is much greater than the size L2 of the first wall 201 of the battery cell 20, the spacer plate 101 occupies too much space of the interior of the battery 10 compared with the battery cells 20, which is disadvantageous to the improvement of the energy density of the battery 10. Therefore, the value of L1/L2 is set to be 0.5~2, which can improve both the energy density of the battery 10 and the strength of the battery 10.

Figure 6:
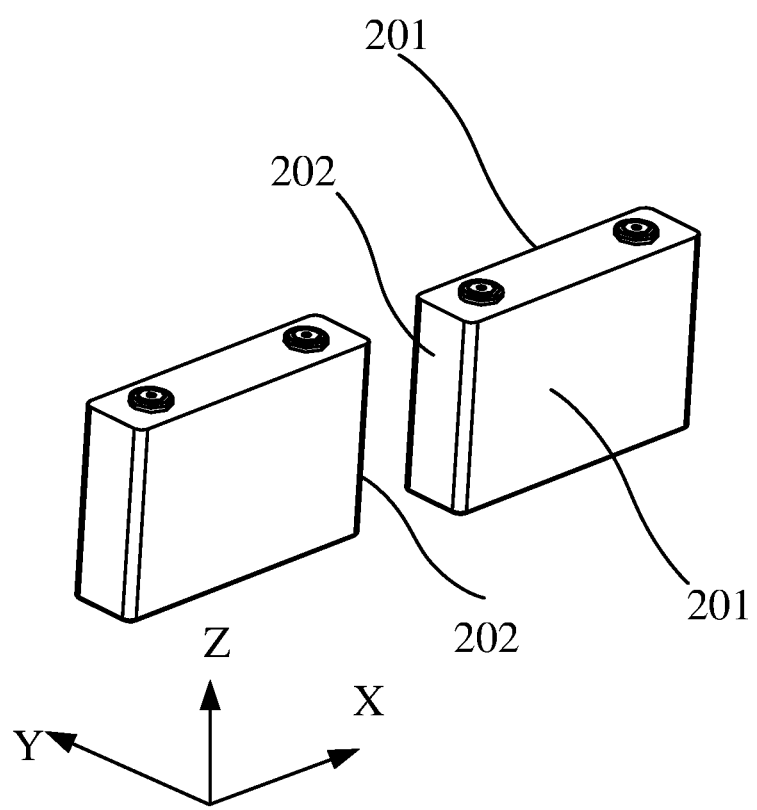
FIG. 6 is a schematic diagram of a battery cell disclosed in an embodiment of the present application.

In an embodiment of the present application, as shown in FIG. 6, the battery cell 20 includes two first walls 201 disposed opposite to each other in the second direction Y and two second walls 202 disposed opposite to each other in the first direction X, where in the first direction X, the second walls 202 of two adjacent battery cells 20 are opposite to each other.

Figure 7:
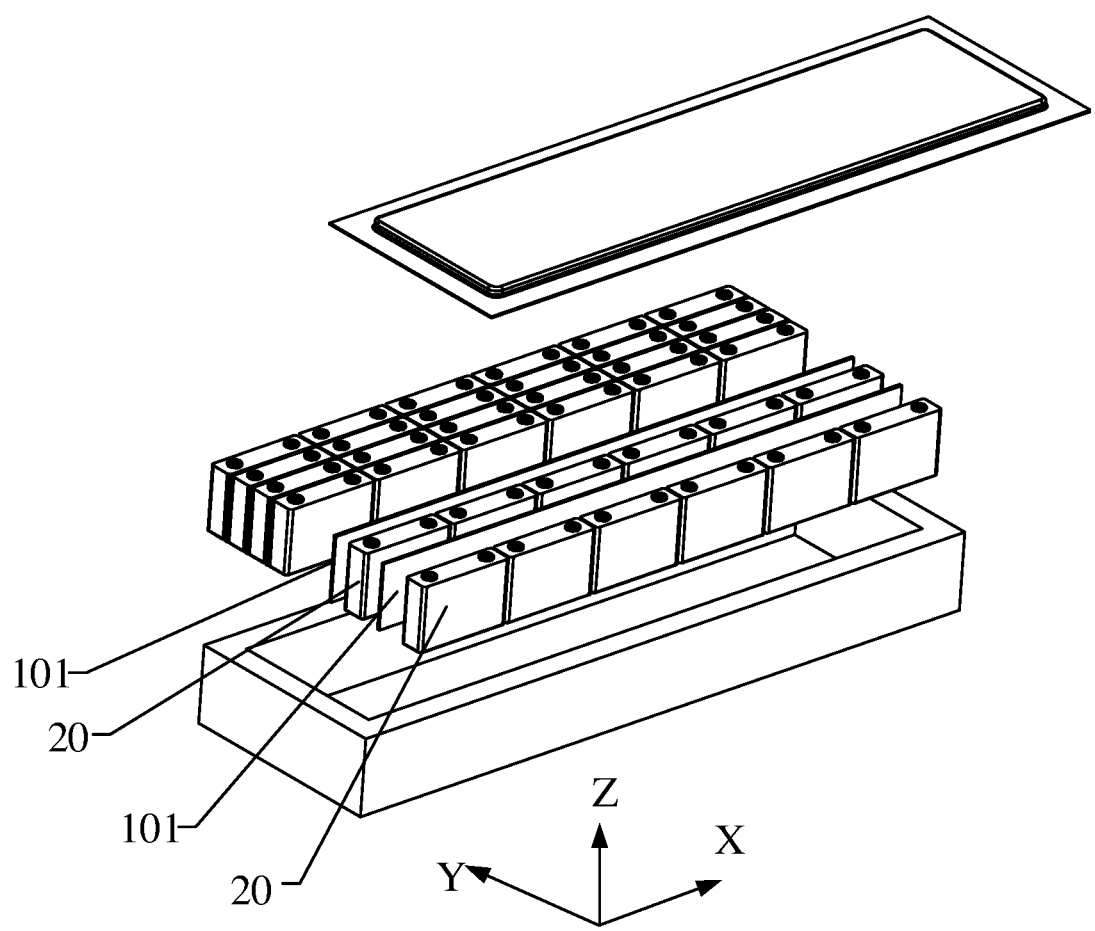
FIG. 7 is a schematic structural diagram of part of a battery disclosed in an embodiment of the present application.

In an embodiment of the present application, as shown in FIG. 7, the battery 10 includes multiple columns of the plurality of battery cells 20 arranged in the first direction X and a plurality of spacer plates 101, where the multiple columns of the battery cells 20 and the plurality of spacer plates 101 are alternately disposed in the second direction Y.

In this way, first walls 201 of each column of the plurality of battery cells 20 arranged in the first direction X can be connected to a spacer plate 101, each column of the plurality of battery cells 20 arranged in the first direction X can be connected as a whole through the spacer plate 101, and thus the strength of the battery 10 is effectively improved.

Figure 8:
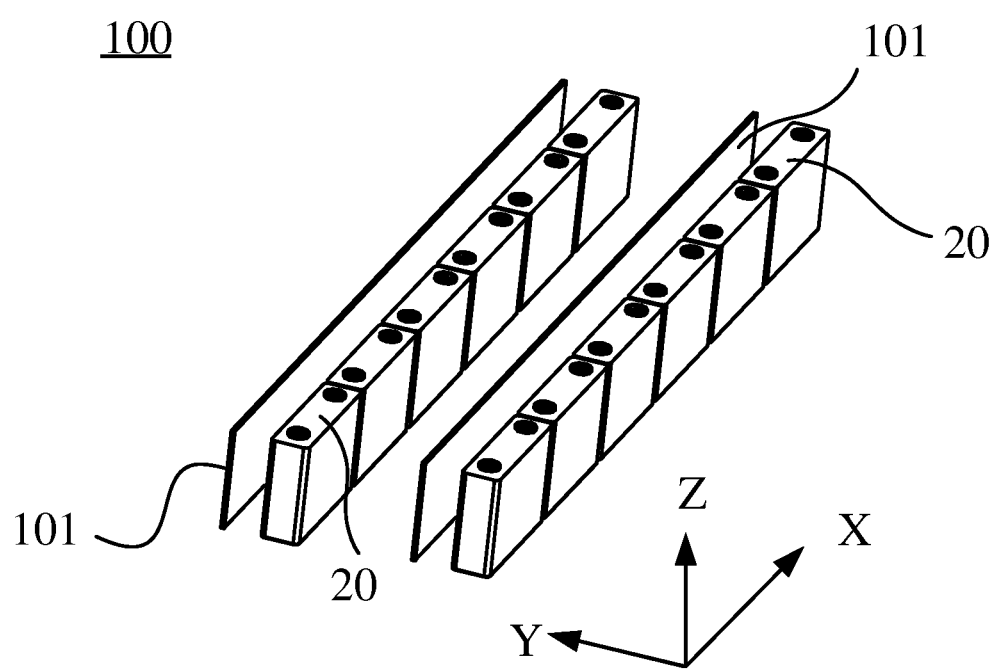
FIG. 8 is a schematic structural diagram of a battery module disclosed in an embodiment of the present application.

In an embodiment of the present application, the battery 10 includes a plurality of battery modules 100. As shown in FIG. 8, a battery module 100 includes at least one column of the plurality of battery cells 20 arranged in the first direction X and at least one spacer plate 101, and the at least one column of the battery cells 20 and the at least one spacer plate 101 are alternately disposed in the second direction Y.

Figure 9:
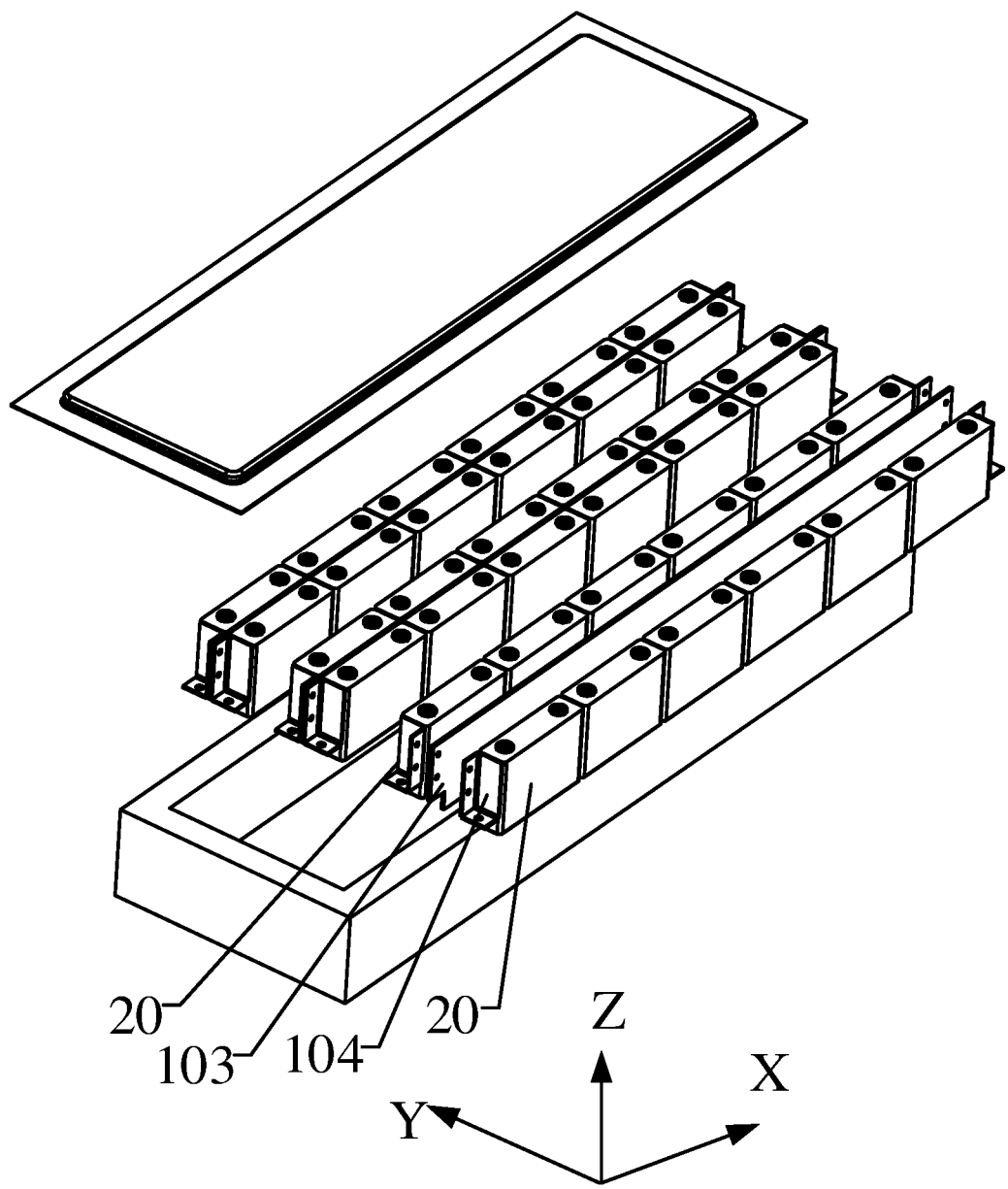
FIG. 9 is a schematic structural diagram of a battery disclosed in an embodiment of the present application.

In an embodiment of the present application, the battery module 100 includes N columns of the battery cells 20 and N−1 spacer plate(s) 101, the spacer plate 101 is disposed between two adjacent columns of the battery cells 20, and N is an integer greater than 1. As shown in FIG. 9, it is illustrated by an example that N is 2.

In an embodiment of the present application, as shown in FIG. 9, the plurality of battery modules 100 are arranged in the second direction Y, and a gap is provided between adjacent battery modules 100.

Optionally, an end part of the spacer plate 101 in the first direction X is provided with a fixing structure 103, and the fixing structure 103 is connected to a fixing member 104 at the end part of the spacer plate 101 in the first direction X to fix the spacer plate 101.

In an embodiment of the present application, the spacer plate 101 is bonded to the first wall 201. The spacer plate 101 is fixedly connected to the first walls 201 by means of bonding, and the structure is simple, which is convenient for processing and assembly.

It should be understood that the spacer plate 101 and the first walls 201 may also be connected by other means, for example, riveting and welding, which is not limited in the embodiments of the present application.

An embodiment of the present application further provides a power consumption device, and the power consumption device may include the battery 10 in the foregoing embodiments. Optionally, the power consumption device may be a vehicle 1, a ship, a spacecraft, or the like, which is not limited in the embodiments of the present application.

The battery 10 and the power consumption device according to the embodiments of the present application are described above. A method and device for producing a battery 10 according to the embodiments of the present application will be described below, and for the parts that are not described in detail, reference is made to the foregoing embodiments.

Figure 10:
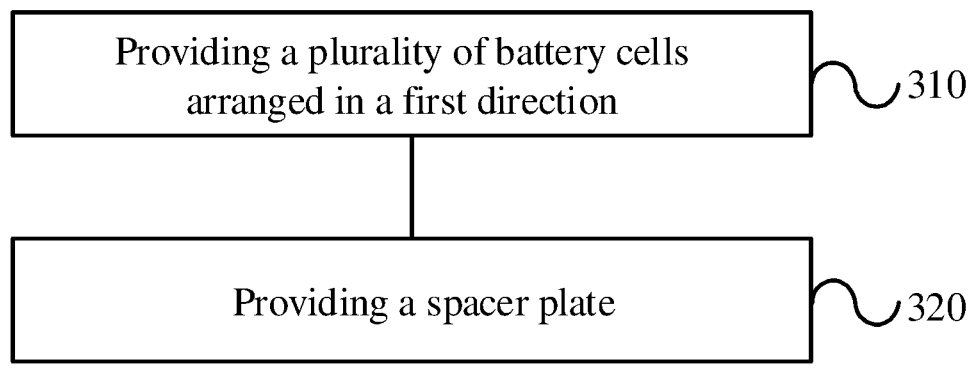
FIG. 10 is a schematic flowchart of a method for producing a battery according to an embodiment of the present application.

FIG. 10 shows a schematic flowchart of a method 300 for producing a battery 10 according to an embodiment of the present application. As shown in FIG. 10, the method 300 may include:

310, providing a plurality of battery cells 20 arranged in a first direction X; and 320, providing a spacer plate 101, the spacer plate 101 extending in the first direction X and being connected to a first wall 201 of each battery cell 20 of the plurality of battery cells 20, the first wall 201 being a wall of the battery cell 20 that has a largest surface area, and a surface of the spacer plate 101 being provided with an insulating layer 102, where a size T1 of the spacer plate 101 in a second direction Y is less than 0.5 mm, and the second direction Y is perpendicular to the first wall 201.

Figure 11:
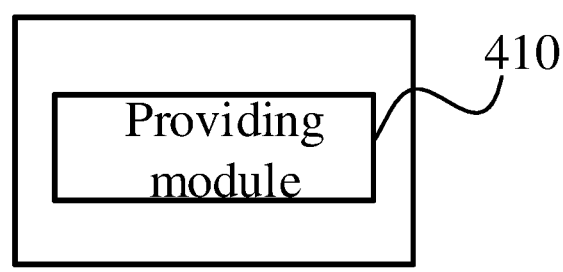
FIG. 11 is a schematic block diagram of a device for producing a battery according to an embodiment of the present application.

FIG. 11 shows a schematic block diagram of a device 400 for producing a battery 10 according to an embodiment of the present application. As shown in FIG. 11, the device 400 for producing the battery 10 may include: a providing module 410.

The providing module 410 is configured to provide a plurality of battery cells 20 arranged in a first direction X and a spacer plate 101, the spacer plate 101 extends in the first direction X and is connected to a first wall 201 of each battery cell 20 of the plurality of battery cells 20, the first wall 201 is a wall of the battery cell 20 that has a largest surface area, and a surface of the spacer plate 101 is provided with an insulating layer 102, where a size T1 of the spacer plate 101 in a second direction Y is less than 0.5 mm, and the second direction Y is perpendicular to the first wall 201.

The embodiments of the present application will be illustrated hereinafter. The embodiments described below are exemplary and merely intended to explain the present application, and may not be understood as limitation to the present application. Embodiments with no specific techniques or conditions specified are conducted according to techniques or conditions described in the literature in the art or according to the product specification.

The battery cell 20 and the spacer plate 101 shown in the accompanying drawings are used to conduct vibration and shock tests against the spacer plate under the standard of GB 38031-2020 *Electric Vehicles Traction Battery Safety Requirements*, and the test results are shown in Table 1. In Table 1, T1 is a size of the spacer plate in the second direction Y, H1 is a size of the spacer plate in the third direction Z, L1 is a size of the spacer plate in the first direction X, H2 is a size of a single battery cell in the third direction Z, L2 is a sum of sizes of the plurality of battery cells in the first direction X, S1=H1*L1, and S2=H2*L2.

TABLE 1

| T1 (mm) | H2 (mm) | L2 (mm) | L1 (mm) | H1 (mm) | S1/S2 | L1/L2 | H1/H2 | Vibration and shock experiment results |
|---|---|---|---|---|---|---|---|---|
| 0.1 | 30 | 400 | 800 | 60 | 4 | 2 | 2 | No cracking, no fire and explosion |
| 0.5 | 30 | 400 | 200 | 15 | 0.25 | 0.5 | 1 | No cracking, no fire and explosion |
| 0.4 | 80 | 1148 | 1148 | 40 | 0.5 | 1 | 0.4 | No cracking, no fire and explosion |
| 0.4 | 80 | 1148 | 574 | 80 | 0.5 | 0.5 | 0.8 | No cracking, no fire and explosion |
| 0.2 | 112 | 1164 | 1224 | 100 | 0.94 | 1.05 | 0.19 | No cracking, no fire and explosion |
| 0.4 | 127 | 348 | 278.4 | 63.5 | 0.4 | 0.8 | 0.5 | No cracking, no fire and explosion |
| 0.4 | 127 | 348 | 174 | 63.5 | 0.25 | 0.5 | 0.8 | No cracking, no fire and explosion |
| 0.3 | 205 | 522 | 582 | 193 | 1.05 | 1.11 | 0.27 | No cracking, no fire and |

TABLE 1-continued

| T1 (mm) | H2 (mm) | L2 (mm) | L1 (mm) | H1 (mm) | S1/S2 | L1/L2 | H1/H2 | Vibration and shock experiment results |
|---|---|---|---|---|---|---|---|---|
| 0.5 | 205 | 522 | 417.6 | 102.5 | 0.4 | 0.80 | 0.625 | explosion |
| | | | | | | | | No cracking, no fire and explosion |
| 0.1 | 112 | 776 | 836 | 100 | 0.96 | 1.08 | 0.09 | No cracking, no fire and explosion |
| 0.5 | 112 | 1164 | 1224 | 100 | 0.94 | 1.05 | 0.48 | No cracking, no fire and explosion |

The battery cell 20 and the spacer plate 101 shown in the accompanying drawings are used, and with reference to IEC 60664-1, 1000 VDC is applied in an insulation test, and an insulating resistance value is equal to or greater than 500 MΩ; and 2700 VDC is applied for 60 S in a pressure resistance test, an insulation and pressure resistance capability of the spacer plate is tested under the condition of a leakage current less than or equal to 1 mA, and the test results are shown in Table 2. In Table 2, T2 is a size of the insulating layer in the second direction Y, and U is a battery voltage.

TABLE 2

| T2 (mm) | U(V) | T2/U ($10^{-3}$ mm/V) | Insulation and pressure resistance experiment results |
|---|---|---|---|
| 0.01 | 1000 | 0.01 | Insulation and pressure resistance satisfy requirements |
| 0.3 | 1000 | 0.3 | Insulation and pressure resistance satisfy requirements |
| 0.3 | 100 | 3 | Insulation and pressure resistance satisfy requirements |
| 0.15 | 400 | 0.38 | Insulation and pressure resistance satisfy requirements |
| 0.15 | 800 | 0.19 | Insulation and pressure resistance satisfy requirements |
| 0.3 | 300 | 1 | Insulation and pressure resistance satisfy requirements |
| 0.3 | 200 | 1.5 | Insulation and pressure resistance satisfy requirements |
| 0.2 | 800 | 0.25 | Insulation and pressure resistance satisfy requirements |
| 0.2 | 350 | 0.57 | Insulation and pressure resistance satisfy requirements |

Although the present application has been described with reference to the preferred embodiments thereof, various modifications can be made thereto without departing from the scope of the present application, and the components therein can be replaced with equivalents. In particular, as long as there is no structural conflict, various technical features mentioned in the various embodiments may be combined in any manner. The present application is not limited to the specific embodiments disclosed herein, and includes all technical solutions falling within the scope of the claims.

What is claimed is:

1. A battery, comprising:
a plurality of battery cells arranged in a first direction; and
a spacer plate, the spacer plate extending in the first direction and being connected to a first wall of each battery cell of the plurality of battery cells, the first wall being a wall of the each battery cell of the plurality of battery cells that has a largest surface area, and a surface of the spacer plate being provided with an insulating layer;
wherein a size T1 of the spacer plate in a second direction is less than 0.5 mm, and the second direction is perpendicular to the first wall;
wherein a voltage U of the battery and a size T2 of the insulating layer in the second direction satisfy: $0.01 \times 10^{-3}$ mm/V$\leq$T2/U$\leq 3 \times 10^{-3}$ mm/V.

2. The battery according to claim 1, wherein the size T1 of the spacer plate in the second direction is not less than 0.05 mm.

3. The battery according to claim 1, wherein an area S1 of a surface of the spacer plate that is connected to first walls of the plurality of battery cells and a total area S2 of the first walls of the plurality of battery cells that are connected to a same side of the spacer plate satisfy: $0.25 \leq S1/S2 \leq 4$.

4. The battery according to claim 1, wherein in a third direction, a size H1 of the spacer plate and a size H2 of the first wall of the each battery cell of the plurality of battery cells satisfy: $0.2 \leq H1/H2 \leq 2$, and the third direction is perpendicular to the first direction and the second direction.

5. The battery according to claim 1, wherein in the first direction, a size L1 of the spacer plate and a size L2 of the plurality of battery cells satisfy: $0.5 \leq L1/L2 \leq 2$.

6. The battery according to claim 1, wherein a size T2 of the insulating layer in the second direction satisfies: $0.01$ mm$\leq$T2$\leq 0.3$ mm.

7. The battery according to claim 1, wherein the each battery cell of the plurality of battery cells comprises two first walls disposed opposite to each other in the second direction and two second walls disposed opposite to each other in the first direction, wherein in the first direction, the second walls of two adjacent battery cells are opposite to each other.

8. The battery according to claim 1, wherein the battery comprises multiple columns of the plurality of battery cells arranged in the first direction and a plurality of spacer plates, wherein the multiple columns of the plurality of battery cells and the plurality of spacer plates are alternately disposed in the second direction.

9. The battery according to claim 1, wherein the battery comprises a plurality of battery modules, a battery module comprises at least one column of the plurality of battery cells arranged in the first direction and at least one spacer plate, and the at least one column of the plurality of battery cells and the at least one spacer plate are alternately disposed in the second direction.

10. The battery according to claim 9, wherein the battery module comprises N columns of the plurality of battery cells and N−1 spacer plate(s), the spacer plate is disposed between two adjacent columns of the plurality of battery cells, and N is an integer greater than 1.

11. The battery according to claim 9, wherein the plurality of battery modules are arranged in the second direction, and a gap is provided between adjacent battery modules.

12. The battery according to claim 1, wherein the spacer plate is bonded to the first wall.

13. A power consumption device, comprising: the battery according to claim 1, the battery being configured to provide electric energy.

14. A method for producing a battery, comprising:
providing a plurality of battery cells arranged in a first direction; and
providing a spacer plate, the spacer plate extending in the first direction and being connected to a first wall of each battery cell of the plurality of battery cells, the first wall being a wall of the each battery cell of the plurality of battery cells that has a largest surface area, and a surface of the spacer plate being provided with an insulating layer;
wherein a size T1 of the spacer plate in a second direction is less than 0.5 mm, and the second direction is perpendicular to the first wall;
wherein a voltage U of the battery and a size T2 of the insulating layer in the second direction satisfy: $0.01 \times 10^{-3}$ mm/V $\leq T2/U \leq 3 \times 10^{-3}$ mm/V.

15. A device for producing a battery, comprising:
a providing module configured to provide a plurality of battery cells arranged in a first direction and a spacer plate, the spacer plate extending in the first direction and being connected to a first wall of each battery cell of the plurality of battery cells, the first wall being a wall of the each battery cell of the plurality of battery cells that has a largest surface area, and a surface of the spacer plate being provided with an insulating layer;
wherein a size T1 of the spacer plate in a second direction is less than 0.5 mm, and the second direction is perpendicular to the first wall;
wherein a voltage U of the battery and a size T2 of the insulating layer in the second direction satisfy: $0.01 \times 10^{-3}$ mm/V $\leq T2/U \leq 3 \times 10^{-3}$ mm/V.

* * * * *